(12) United States Patent
Kim et al.

(10) Patent No.: US 10,089,243 B2
(45) Date of Patent: Oct. 2, 2018

(54) MEMORY CONTROLLER AND SYSTEM INCLUDING VARIABLE ADDRESS MAPPING TABLES AND A FIXED ADDRESS MAPPING TABLE

(71) Applicant: SK hynix Inc., Gyeonggi-do (KR)

(72) Inventors: Ki-Sun Kim, Seoul (KR); Sang-Yeon Kim, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/441,472

(22) Filed: Feb. 24, 2017

(65) Prior Publication Data

US 2017/0249256 A1 Aug. 31, 2017

(30) Foreign Application Priority Data

Feb. 25, 2016 (KR) .......................... 10-2016-0022706
Jan. 10, 2017 (KR) .......................... 10-2017-0003479

(51) Int. Cl.
*G06F 12/1009* (2016.01)
*G06F 3/06* (2006.01)
*G06F 13/00* (2006.01)
*G06F 13/16* (2006.01)

(52) U.S. Cl.
CPC ........ *G06F 12/1009* (2013.01); *G06F 3/0604* (2013.01); *G06F 3/064* (2013.01); *G06F 3/0685* (2013.01); *G06F 13/1668* (2013.01); *G06F 2212/657* (2013.01)

(58) Field of Classification Search
CPC .... G06F 12/1009; G06F 3/0604; G06F 3/064; G06F 3/0685; G06F 2212/657; G06F 12/04; G06F 12/0292
See application file for complete search history.

(56) References Cited

U.S. PATENT DOCUMENTS

| 6,212,611 | B1* | 4/2001 | Nizar .................. | G06F 13/1626 |
| | | | | 711/154 |
| 2006/0179212 | A1* | 8/2006 | Kim .................... | G06F 12/0246 |
| | | | | 711/103 |
| 2008/0077729 | A1* | 3/2008 | Kim .................... | G06F 12/0246 |
| | | | | 711/103 |
| 2008/0307192 | A1 | 12/2008 | Sinclair et al. | |
| 2010/0146194 | A1* | 6/2010 | Cheng ................. | G06F 12/0246 |
| | | | | 711/103 |

(Continued)

*Primary Examiner* — Glenn Gossage
(74) *Attorney, Agent, or Firm* — IP & T Group LLP

(57) ABSTRACT

A memory controller includes a plurality of ports coupled with a host device and a plurality of channels coupled with a memory device. The memory controller also includes an arbiter receiving a first address received through the plurality of ports to output the first address; a mapping table storage block, including a plurality of address mapping tables, selecting an address mapping table, corresponding to the first address, among the plurality of address mapping tables and outputting the selected address mapping table as a variable address mapping table; an address mapping block mapping the first address to a second address according to the variable address mapping table, and a fixed address mapping table; and a scheduler outputting the second address to the channels. The plurality of address mapping tables may employ different methods of mapping one or more first bits of the first address to the second address.

10 Claims, 6 Drawing Sheets

(56) References Cited

U.S. PATENT DOCUMENTS

| | | | |
|---|---|---|---|
| 2012/0311238 A1* | 12/2012 | Im | G06F 12/0638 |
| | | | 711/103 |
| 2013/0246734 A1* | 9/2013 | Schaefer | G06F 11/3409 |
| | | | 711/206 |
| 2014/0032873 A1* | 1/2014 | Ozdemir | G06F 13/16 |
| | | | 711/202 |
| 2014/0068152 A1 | 3/2014 | Sinclair | |
| 2014/0164677 A1* | 6/2014 | Borchers | G06F 3/0611 |
| | | | 711/103 |
| 2014/0177324 A1* | 6/2014 | Liu | G11C 8/16 |
| | | | 365/154 |

* cited by examiner

MEMORY CONTROLLER AND SYSTEM INCLUDING VARIABLE ADDRESS MAPPING TABLES AND A FIXED ADDRESS MAPPING TABLE

CROSS-REFERENCE TO RELATED APPLICATION

This application claims priority under 35 U.S.C. § 119 to Korean Patent Application No. 10-2016-0022706 filed on Feb. 25, 2016 and Korean Patent Application No. 10-2017-0003479 filed on Jan. 10, 2017, the entire contents of which are incorporated herein by reference.

TECHNICAL FIELD

This patent document relates to a memory controller and an integrated circuit system.

DISCUSSION OF THE RELATED ART

FIG. 1 is a configuration diagram illustrating an example of an integrated circuit system.

Referring to FIG. 1, an integrated circuit system may include one or more host devices 110_0 to 110_n (n is a natural number), a memory controller 120, and one or more memory devices 130_0 to 130_m (m is a natural number).

The host devices 110_0 to 110_n of the integrated circuit system may perform calculations, and the memory devices 130_0 to 130_m may store data used by the host devices 110_0 to 110_n and which may be accessed by requests from the host devices 110_0 to 110_n. The host devices 110_0 to 110_n which access the memory devices 130_0 to 130_m may provide logical addresses LOGIC_ADD to the memory controller 120. The logical addresses LOGIC_ADD provided from the host devices 110_0 to 110_n may be converted into physical addresses PHY_ADD of the memory devices 130_0 to 130_m in the memory controller 120 which controls the memory devices 130_0 to 130_m. The memory controller 120 may control the memory devices 130_0 to 130_m by providing the converted physical addresses PHY_ADD to the memory devices 130_0 to 130_m. Therefore, the memory devices 130_0 to 130_m may perform requested operations based not on the logical addresses LOGIC_ADD but on the physical addresses PHY_ADD generated by converting the logical addresses LOGIC_ADD. For such converting operations, the memory controller 120 may include address mapping tables.

SUMMARY

Various embodiments are directed to a memory controller and an integrated circuit system, in which a logical address inputted from a host device is address-mapped to a physical address in consideration of a pattern in which the corresponding host device accesses a memory device, thereby allowing the corresponding host device to access a memory device in conformity with a required performance characteristic.

In an embodiment, a memory controller may include: a plurality of ports coupled with at least one host device; a plurality of channels coupled with at least one memory device; an arbiter receiving a first address received through the plurality of ports, and outputting the first address; a mapping table storage block, including a plurality of address mapping tables, selecting an address mapping table corresponding to the first address among the plurality of address mapping tables and outputting the selected address mapping table as a variable address mapping table; an address mapping block mapping the first address to a second address according to the variable address mapping table and a fixed address mapping table; and a scheduler suitable for outputting the second address to the channels.

In an embodiment, a memory controller may include: a plurality of ports coupled with at least one host device; a plurality of channels coupled with at least one memory device; an arbiter receiving a first address received through the plurality of ports, and outputting the first address; a mapping table storage block, including a plurality of address mapping tables, selecting an address mapping table corresponding to the first address among the plurality of address mapping tables and outputting the selected address mapping table as a variable address mapping table; an address mapping block mapping the first address to a second address according to the variable address mapping table; and a scheduler outputting the second address to the channels.

In an embodiment, an integrated circuit system may include: a plurality of host devices; a plurality of memory devices; and a memory controller, including a plurality of address mapping tables, mapping a first address received from at least one host device among the plurality of host devices, to a second address, by using an address mapping table selected among the plurality of address mapping tables and a fixed address mapping table, and transmitting the second address to at least one memory device among the plurality of memory devices.

DETAILED DESCRIPTION

Figure 1:
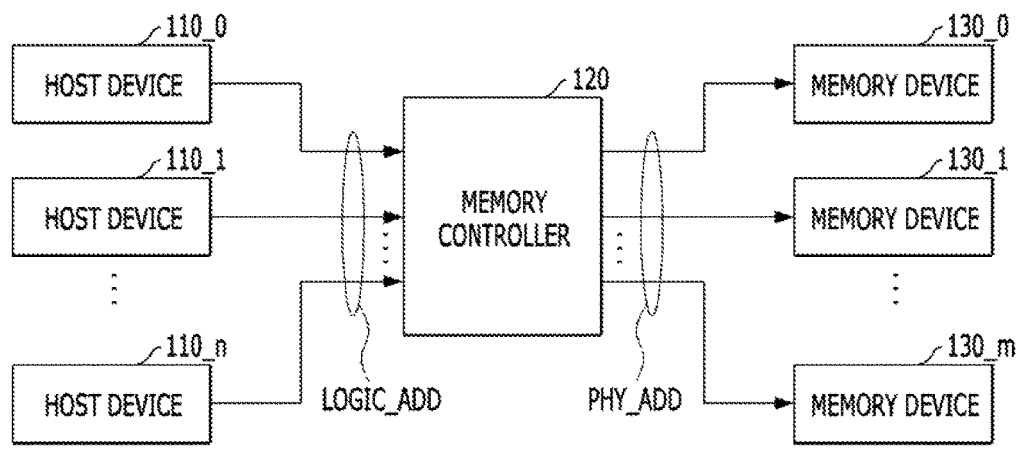
FIG. 1 is a diagram illustrating an example of an integrated circuit system.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
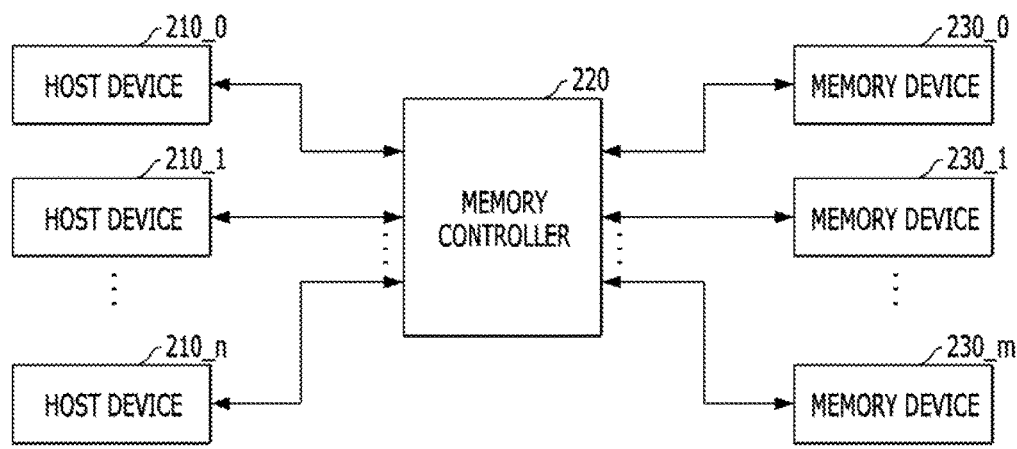
FIG. 2 is a diagram illustrating an integrated circuit system in accordance with an embodiment of the present invention.

FIG. 2 is a configuration diagram illustrating an integrated circuit system in accordance with an embodiment of the present invention.

Referring to FIG. 2, an integrated circuit system may include a plurality of host devices 210_0 to 210_n (n is a natural number), a memory controller 220, and a plurality of memory devices 230_0 to 230_m (m is a natural number).

Each of the host devices 210_0 to 210_n may include a device, such as a central processing unit (CPU), a graphic processing unit (GPU), a video encoder/decoder, an image signal processor (ISP) and a display device. Each of the host devices 210_0 to 210_n may perform a calculation and control each of the memory devices 230_0 to 230_m to access data such as data needed for the calculation or calculation result data. The host devices 210_0 to 210_n may transmit requests for storing data in the memory devices 230_0 to 230_m or reading out data stored in the memory devices 230_0 to 230_m. Also, the host devices 210_0 to 210_n may transmit, together with the requests, addresses each indicating which portion of which memory device is to be accessed. The addresses transmitted by the host devices 210_0 to 210_n may be logical addresses which are different from physical structures of the memory devices 230_0 to 230_m.

Each of the plurality of host devices 210_0 to 210_n may be allocated with and use specified values of a logical address. For example, when assuming that the value of a logical address is a 10-bit information, the number of the host devices 210_0 to 210_n is 4 and each of the host devices 210_0 to 210_n is allocated with and use the same number of values of logical addresses, a first host device 210_0 may be allocated with logical addresses of 0000000000 to 0011111111111, a second host device 210_1 may be allocated with logical addresses of 0100000000 to 0111111111111, a third host device 210_2 may be allocated with logical addresses of 1000000000 to 1011111111111, and a fourth host device 210_3 may be allocated with logical addresses of 1100000000 to 1111111111111. Each of the plurality of host devices 210_0 to 210_n may access a memory device by using a request for the memory device and any one of the logical addresses allocated to itself.

The memory controller 220 may store a plurality of address mapping tables. The memory controller 220 may map a logical address received from a host device to a physical address by using an address mapping table selected among the plurality of address mapping tables and a fixed address mapping table, and transmit the physical address to a memory device. Also, the memory controller 220 may convert requests received from the host devices 210_0 to 210_n, into control signals for controlling the memory devices 230_0 to 230_m, transfer the control signals to the memory devices 230_0 to 230_m, and transfer data between the host devices 210_0 to 210_n and the memory devices 230_0 to 230_m.

Figure 3:
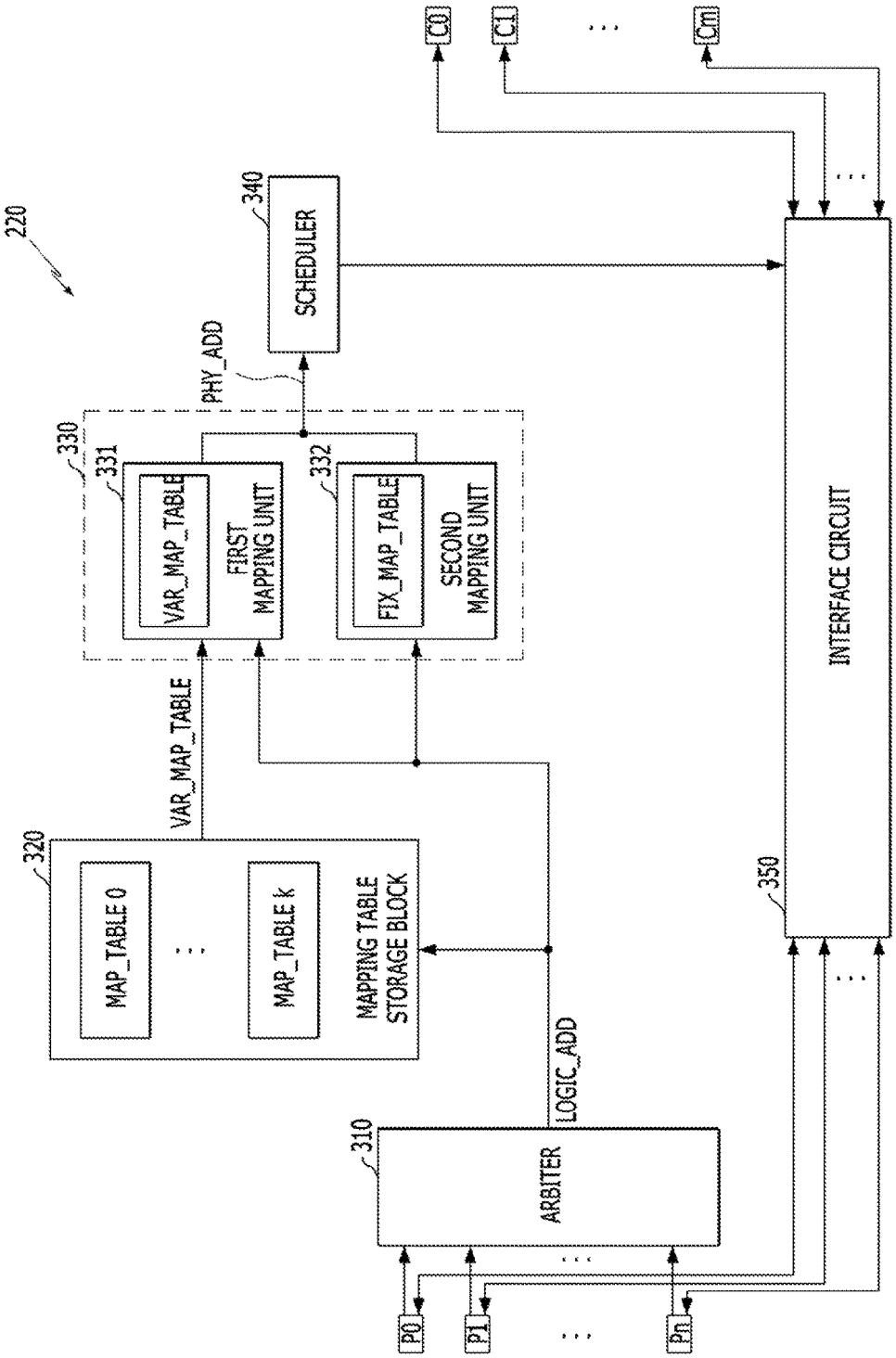
FIG. 3 is a diagram illustrating a memory controller in accordance with an embodiment of the present invention.

FIG. 3 is a configuration diagram illustrating the memory controller 220 in accordance with an embodiment of the present invention.

Referring to FIG. 3, the memory controller 220 may include a plurality of input/output ports P0 to Pn, a plurality of input/output channels C0 to Cm, an arbiter 310, a mapping table storage block 320, an address mapping block 330, a scheduler 340, and an interface circuit 350.

The plurality of input/output ports P0 to Pn may be coupled with corresponding host devices among the one or more host devices 210_0 to 210_n. Signal transfer between the memory controller 220 and the host devices 210_0 to 210_n may be implemented through the input/output ports coupled with the corresponding host devices. For example, in the case where the host device 210_0 and the input/output port P0 of the memory controller 220 are coupled, signal transfer between the host device 210_0 and the memory controller 220 may be implemented through the input/output port P0. While FIG. 3 illustrates the case where the numbers of the input/output ports P0 to Pn and the host devices 210_0 to 210_n are the same and the input/output ports P0 to Pn and the host devices 210_0 to 210_n correspond one to one, it is to be noted that the numbers and correspondence relationship of the input/output ports P0 to Pn and the host devices 210_0 to 210_n may be changed depending on a design.

The plurality of input/output channels C0 to Cm may be coupled with corresponding memory devices among the one or more memory devices 230_0 to 230_m. Signal transfer between the memory controller 220 and the memory devices 230_0 to 230_m may be implemented through the input/output channels coupled with the corresponding memory devices. For example, in the case where the memory device 230_0 and the input/output channel C0 of the memory controller 220 are coupled, signal transfer between the memory device 230_0 and the memory controller 220 may be implemented through the input/output channel C0. While FIG. 3 illustrates the case where the numbers of the input/output channels C0 to Cm and the memory devices 230_0 to 230_m are the same and the input/output channels C0 to Cm and the memory devices 230_0 to 230_m correspond one to one, it is to be noted that the numbers and correspondence relationship of the input/output channels C0 to Cm and the memory devices 230_0 to 230_m may be changed depending on a design.

The arbiter 310 may store requests and logical addresses received through the input/output ports P0 to Pn from the host devices 210_0 to 210_n, and output the requests and logical addresses in a predetermined sequence. For example, a predetermined sequence may include outputting requests and logical addresses in the same order as in their input sequence i.e., as they are received, or outputting requests and logical addresses in a different order than the order in which they are received based on a preferential scheme that may output first a request and a logical address which requires preferential processing, or outputting requests and logical addresses in a different order than the order in which they are received by outputting first a request and a logical address received from a specified host device, and so forth.

The mapping table storage block 320 may store a plurality of address mapping tables MAP_TABLE0 to MAP_TABLEk (k is a natural number). The mapping table storage block 320 may select an address mapping table which corresponds to the request and logical address LOGIC_ADD outputted from the arbiter 310, among the plurality of address mapping tables MAP_TABLE0 to MAP_TABLEk. Then the mapping table storage block 320 may output the selected address mapping table as a variable address mapping table VAR_MAP_TABLE. Each of the plurality of address mapping tables MAP_TABLE0 to MAP_TABLEk may map one or more first bits among the plurality of bits included in a logical address, to one or more first bits among the plurality of bits included in a physical address. In this regard, methods in which the plurality of address mapping tables MAP_TABLE0 to MAP_TABLEk map first bits of a logical address to first bits of a physical address may be different from one another. For example, a method in which a first address mapping table MAP_TABLE0 maps first bits of a logical address to first bits of a physical address and a method in which a second address mapping table MAP_TABLE1 maps first bits of a logical address to first bits of a physical address may be different from each other.

The mapping table storage block 320 may select one address mapping table among the plurality of address mapping tables MAP_TABLE0 to MAP_TABLEk, by referring to from which host device the request and logical address LOGIC_ADD outputted from the arbiter 310 are transmitted. The mapping table storage block 320 may include a volatile memory or a nonvolatile memory to store information on the plurality of address mapping tables MAP_TABLE0 to MAP_TABLEk. A volatile memory may include a dynamic random access memory (DRAM), a mobile DRAM, a static random access memory (SRAM), or a memory which performs a function similar thereto. A nonvolatile memory may include a read only memory (ROM), a NOR flash memory, a NAND flash memory, a phase-change random access memory (PRAM), a resistive random access memory (RRAM), a spin transfer torque random access memory (STTRAM), a magnetic random access memory (MRAM), or a memory which performs a function similar thereto.

The mapping table storage block 320 may refer to which of the host devices 210_0 to 210_n the logical address LOGIC_ADD outputted from the arbiter 310 is allocated, and select and output an address mapping table corresponding to the corresponding host device or logical address among the plurality of address mapping tables MAP_TABLE0 to MAP_TABLEk. For example, it is assumed that the first address mapping table MAP_TABLE0 corresponds to the first host device 210_0 and the second address mapping table MAP_TABLE1 corresponds to the second host device 210_1. In this case, the mapping table storage block 320 may output the variable address mapping table VAR_MAP_TABLE by selecting the first address mapping table MAP_TABLE0 when the logical address LOGIC_ADD outputted from the arbiter 310 corresponds to the first host device 210_0. The mapping table storage block 320 may output the variable address mapping table VAR_MAP_TABLE by selecting the second address mapping table MAP_TABLE1 when the logical address LOGIC_ADD outputted from the arbiter 310 corresponds to the second host device 210_1.

In some embodiments, the plurality of address mapping tables MAP_TABLE0 to MAP_TABLEk may be configured according to the access patterns of the host devices 210_0 to 210_n or at least one performance characteristic which is considered important when the respective host devices 210_0 to 210_n access the memory devices 230_0 to 230_m.

In some embodiments, the access patterns of the host devices 210_0 to 210_n may represent how the host devices 210_0 to 210_n transmit logical addresses when accessing consecutively the memory devices 230_0 to 230_m. For example, in consecutive access operations, the host devices 210_0 to 210_n may transmit the values of the logical addresses allocated to them, by increasing or decreasing the values with a predetermined interval. The interval with which the values of the logical addresses are increased or decreased may be changed depending on a setting, and the size of the interval may be fixed or variable. Alternatively, in consecutive access operations, the host devices 210_0 to 210_n may transmit logical addresses which are generated randomly, among the logical addresses allocated to them. Access patterns are not limited to these examples, and may be changed variously depending on a design.

Examples of important performance characteristics of the memory devices that may be considered important when the host devices 210_0 to 210_n access the memory devices 230_0 to 230_m may include at least one of a latency, bandwidth and power consumption. When consecutively accessing the memory devices 230_0 to 230_m, it may be advantageous to consecutively access memory cells with positions that have a predetermined physical relationship, to decrease a latency, increase a bandwidth or reduce power consumption.

When the values of the logical addresses transmitted from the host devices 210_0 to 210_n have a first pattern and physical addresses to be accessed in the memory devices 230_0 to 230_m to improve a specified performance characteristic in consecutive access operations have a second pattern, address mapping tables may be configured such that the logical addresses with the first pattern are mapped to the physical addresses with the second pattern. In detail, it is assumed that the values of logical addresses transmitted consecutively from the first to third host devices 210_0 to 210_2 have first to third patterns, respectively, and the values of physical addresses to be accessed consecutively in memory devices to decrease a latency, increase a bandwidth or reduce power consumption have first to third patterns, respectively. In this regard, address mapping tables may be configured as in [Table 1] depending on a corresponding host device and a performance characteristic to be improved.

TABLE 1

| Corresponding host device | Performance characteristic to be improved | Address mapping |
|---|---|---|
| First host device (210_0) | Latency decrease | First logical pattern -> First physical pattern |
| | Bandwidth increase | First logical pattern -> Second physical pattern |
| | Power consumption Reduction | First logical pattern -> Third physical pattern |
| Second host device (210_1) | Latency decrease | Second logical pattern -> First physical pattern |
| | Bandwidth increase | Second logical pattern -> Second physical pattern |
| | Power consumption Reduction | Second logical pattern -> Third physical pattern |
| Third host device (210_2) | Latency decrease | Third logical pattern -> First physical pattern |
| | Bandwidth increase | Third logical pattern -> Second physical pattern |
| | Power consumption Reduction | Third logical pattern -> Third physical pattern |

For example, in the case of a dynamic random access memory (DRAM), in order to decrease a latency, it may be advantageous that consecutive access operations are performed for one word line. In the case of a DRAM, after a word line, which is to be accessed, is activated (or enabled) and memory cells coupled to the activated word line are accessed, in order to access another word line, the currently activated word line should be precharged and then a word line which is to be accessed next should be activated. Thus, a lengthy time may be required to precharge the currently activated word line and activate the word line to which is to be accessed next. Therefore, in a state in which one word line is activated, if the memory cells coupled to the word line are accessed consecutively, a latency may be decreased. In consideration of this fact, an address mapping table devised in order to decrease a latency may be configured such that consecutively transmitted logical addresses are concentrated on one word line of a DRAM by considering in which pattern a corresponding host device transmits logical addresses in consecutive access operations.

The address mapping block 330 may map a logical address to a physical address according to the variable address mapping table VAR_MAP_TABLE and a fixed address mapping table FIX_MAP_TABLE. To this end, the address mapping block 330 may include first and second mapping units 331 and 332.

The first mapping unit 331 may store the variable address mapping table VAR_MAP_TABLE, and map the first bits of a logical address LOGIC_ADD to the first bits of a physical address PHY_ADD according to the variable address mapping table VAR_MAP_TABLE. Since the variable address mapping table VAR_MAP_TABLE is changed depending on which host device transmitted the logical address which is mapped, a scheme in which the first mapping unit 331 maps the first bits of a logical address LOGIC_ADD to the first bits of a physical address PHY_ADD may be changed each time.

The second mapping unit 332 may store the fixed address mapping table FIX_MAP_TABLE, and map the second bits of a logical address LOGIC_ADD to the second bits of a physical address PHY_ADD according to the fixed address mapping table FIX_MAP_TABLE. Since the fixed address mapping table FIX_MAP_TABLE has a fixed value regardless of the host devices 210_0 to 210_n, a scheme in which the second mapping unit 332 maps the second bits of a logical address LOGIC_ADD to the second bits of a physical address PHY_ADD may be always the same.

The scheduler 340 may store requests and physical addresses PHY_ADD, and output them to the input/output channels C0 to Cm in a predetermined sequence. A sequence in which the scheduler 340 outputs requests and physical addresses PHY_ADD may be configured variously.

The interface circuit 350 may perform the function of transferring signals among the host devices 210_0 to 210_n, the memory controller 220 and the memory devices 230_0 to 230_m.

The signals transferred by the interface circuit 350 may include requests of the host devices 210_0 to 210_n, logical addresses, physical addresses and data transferred between the host devices 210_0 to 210_n and the memory devices 230_0 to 230_m.

The integrated circuit system of FIGS. 2 and 3 does not use a fixed address mapping method. Instead, in the integrated circuit system of FIGS. 2 and 3, a plurality of address mapping tables each corresponding to one or more host devices are stored in advance in consideration of the access patterns of host devices and a performance characteristic to improve, and, when a request from a host device is received, a partial address included in a logical address is mapped to a partial address included in a physical address, in a manner that is optimized for the host device, whereby the performance characteristic of a memory device may be improved by address mapping only.

Figure 4:
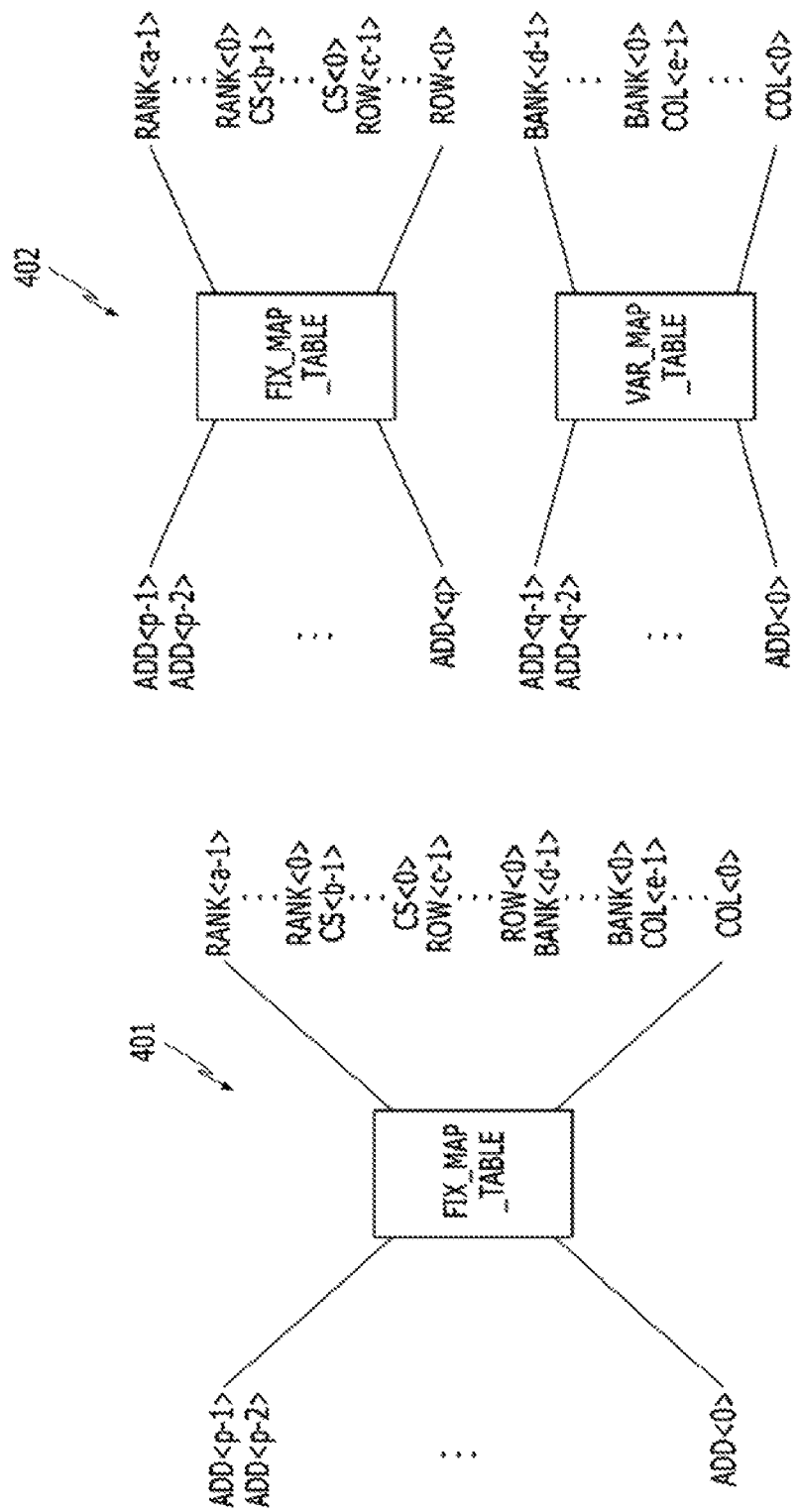
FIG. 4 is a diagram to assist in the explanation of the difference between address mapping according to the conventional art and address mapping of the integrated circuit system in accordance with an embodiment of the present invention.

FIG. 4 is a diagram to assist in the explanation of the difference between address mapping according to the conventional art and address mapping of the integrated circuit system in accordance with the embodiment. Hereinbelow, descriptions will be made for the case where a logical address is p (p is a natural number) bits and a physical address is configured by a rank address of a (a is a natural number) bits, a chip select address of b (b is a natural number) bits, a row address of c (c is a natural number) bits, a bank address of d (d is a natural number) bits and a column address with e (e is a natural number) bits. The configuration of a physical address is nothing but a mere example, and may be changed depending on or according to which structure a plurality of memory cells are organized in the memory devices 230_0 to 230_m.

The rank address may be an address to select a rank unit including at least two memory devices. The chip select address may be an address to select one memory device. The row address may be an address for selecting a row included in a selected memory device. The column address may be an address to select a column included in the selected memory device.

Referring to FIG. 4, in the case of a conventional art generally designated with numeral 401, entire p bits of a logical address ADD<0:p-1> may be mapped to a rank address RANK<0:a-1>, a chip select address CS<0:b-1>, a row address ROW<0:c-1>, a bank address BANK<0:d-1> and a column address COL<0:e-1> according to a fixed address mapping table FIX_MAP_TABLE. In this case, the access patterns of the host devices 210_0 to 210_n and performance characteristics to improve may not be considered.

In the case generally designated with numeral 402 wherein the address mapping block 330 of FIG. 2 is employed according to an embodiment of the present invention, among entire bits of a logical address ADD<0:p-1>, second bits ADD<q:p-1> (q is a natural number less than p) are mapped to second bits RANK<0:a-1>, CS<0:b-1> and ROW<0:c-1> of a physical address according to the fixed address mapping table FIX_MAP_TABLE, and first bits ADD<0:q-1> may be mapped to first bits BANK<0:d-1> and COL<0:e-1> of the physical address according to the variable address mapping table VAR_MAP_TABLE.

The number of bits of a logical address and a physical address mapped according to the variable address mapping table VAR_MAP_TABLE and the number of bits of the logical address and the physical address mapped according to the fixed address mapping table FIX_MAP_TABLE may be changed depending on a design. That is to say, the numbers of bits configuring first and second bits in logical and physical addresses may be changed depending on a design. In the case of the address mapping block 330 of FIGS. 2 and 3, because the first bits of a logical address are mapped changeably in consideration of the access patterns of the host devices 210_0 to 210_n and the optimization of at least one performance characteristic of a memory device which is to be accessed, the overall performance of the integrated circuit system may be improved.

The second bits of logical and physical addresses which are mapped according to the fixed address mapping table FIX_MAP_TABLE may be set as a portion which is rarely changed in the consecutive access operations of the host devices 210_0 to 210_n (namely, cold bits). Also, the first bits of the logical and physical addresses which are mapped according to the variable address mapping table VAR_MAP_TABLE may be set as a portion which is continuously changed in the consecutive access operations of the host devices 210_0 to 210_n (namely, hot bits).

Figure 5:
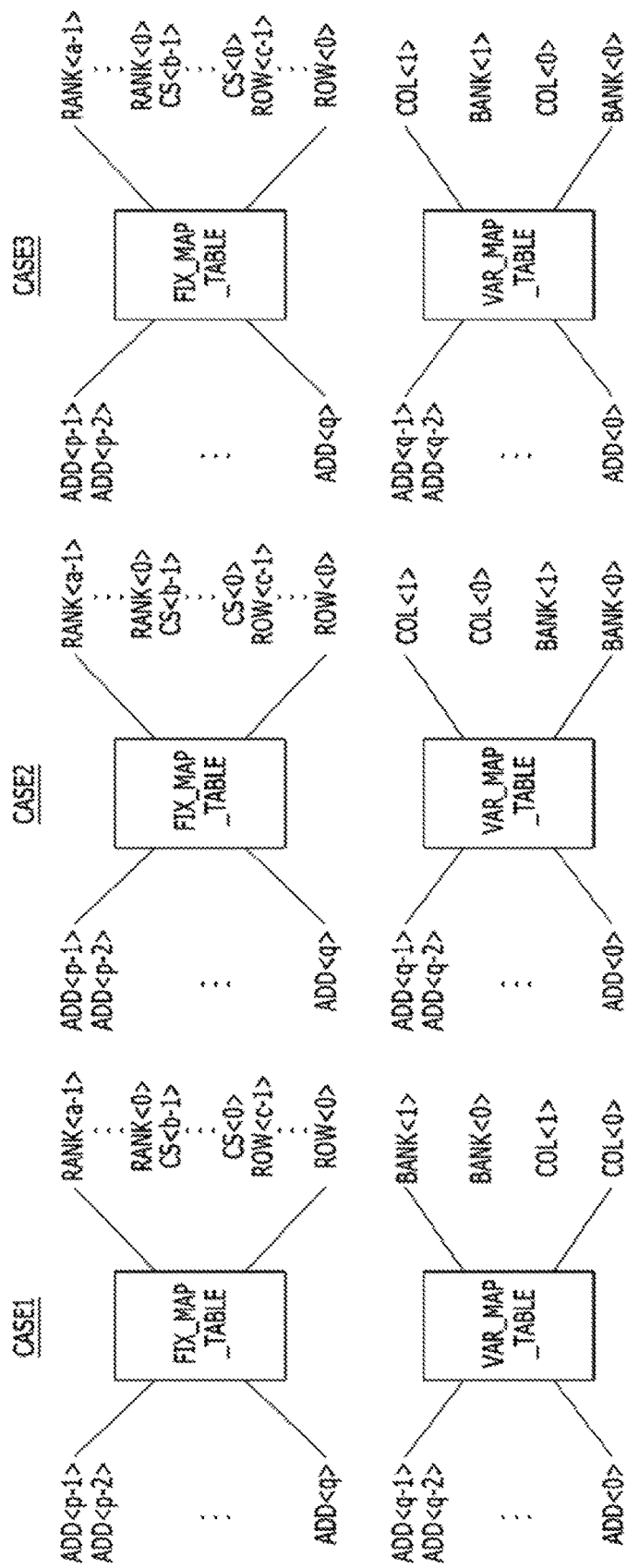
FIG. 5 is a diagram illustrating examples of the address mapping of the integrated circuit system shown in FIG. 2.

FIG. 5 is a diagram illustrating examples of the address mapping of the integrated circuit system shown in FIG. 2. In the following descriptions, it may be assumed that each of a bank address BANK<0:1> and a column address COL<0:1> is 2 bits.

Referring to FIG. 5, in all cases CASE1 to CASE3, second bits ADD<q:p-1> of a logical address may be mapped to second bits RANK<0:a-1>, CS<0:b-1> and ROW<0:c-1> of a physical address according to the fixed address mapping table FIX_MAP_TABLE.

First bits ADD<0:q-1> of the logical address may be mapped to first bits BANK<0:1> and COL<0:1> of the physical address according to the variable address mapping table VAR_MAP_TABLE. In this regard, in a first case CASE1, mapping may be performed to the physical address configured by BANK<1> (i.e., a most significant bit among the first bits), BANK<0>, COL<1>, COL<0> (i.e., a least significant bit among the first bits). In a second case CASE2, mapping may be performed to the physical address configured by COL<1> (i.e., a most significant bit among the first bits), COL<0>, BANK<1>, BANK<0> (i.e., a least significant bit among the first bits).

In a third case CASE3, mapping may be performed to the physical address configured by COL<1> (i.e., a most significant bit among the first bits), BANK<1>, COL<0>, BANK<0> (i.e., a least significant bit among the first bits).

It is noted that the address mapping shown in FIG. 5 is provided for illustration purposes only, and that a method for mapping addresses may be changed.

Figure 6:
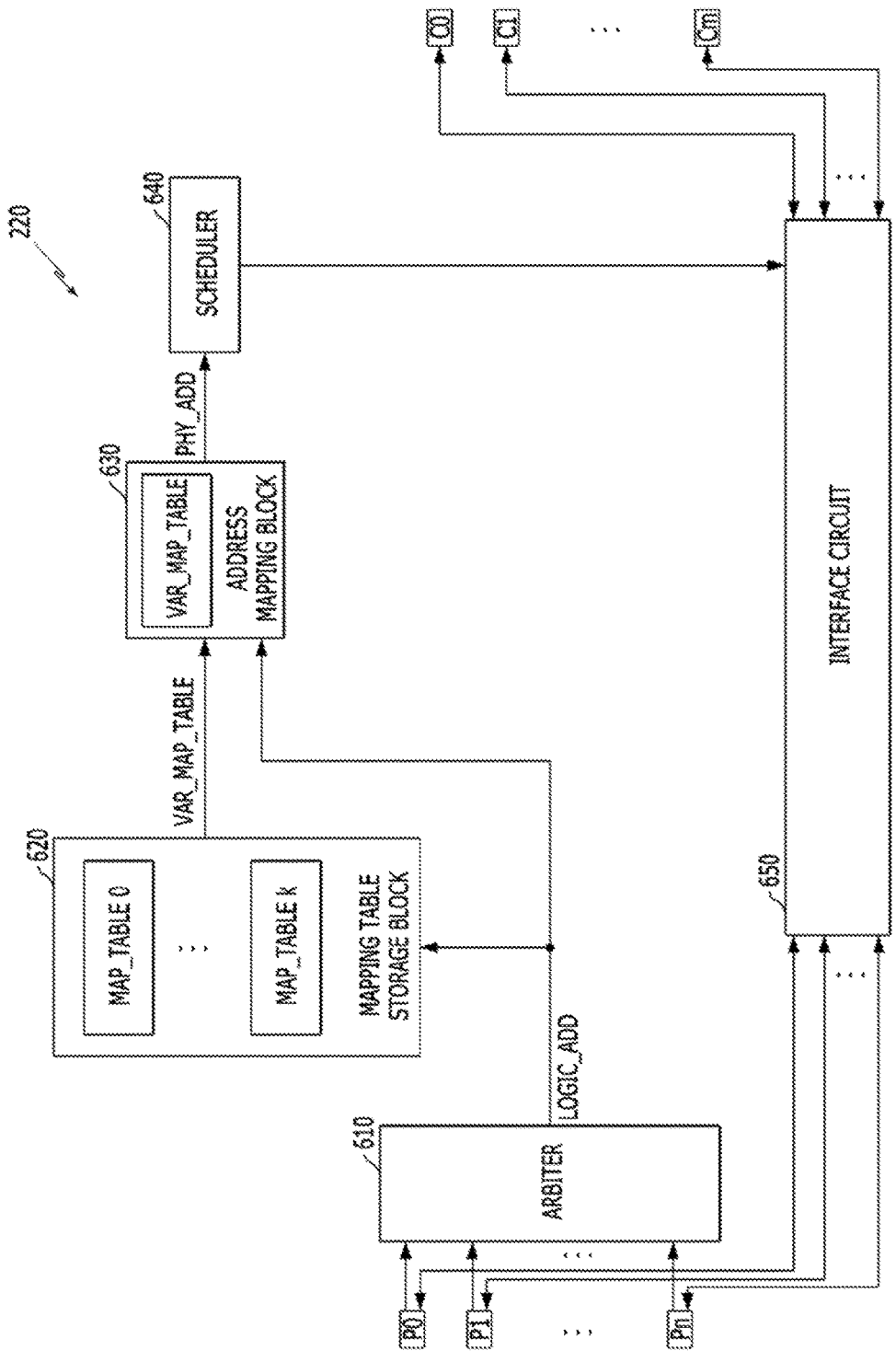
FIG. 6 is a diagram illustrating a memory controller in accordance with another embodiment of the present invention.

FIG. 6 is a configuration diagram illustrating the memory controller 220 in accordance with another embodiment of the present invention.

Referring to FIG. 6, the memory controller 220 may include a plurality of input/output ports P0 to Pn, a plurality of input/output channels C0 to Cm, an arbiter 610, a mapping table storage block 620, an address mapping block 630, a scheduler 640, and an interface circuit 650.

The mapping table storage block 620 may store a plurality of address mapping tables MAP_TABLE0 to MAP_TABLEk (k is a natural number). The mapping table storage block 620 may select an address mapping table which corresponds to the request and logical address LOGIC_ADD outputted from the arbiter 610, among the plurality of address mapping tables MAP_TABLE0 to MAP_TABLEk, and output the selected address mapping table as a variable address mapping table VAR_MAP_TABLE. Each of the plurality of address mapping tables MAP_TABLE0 to MAP_TABLEk may map the plurality of bits included in a logical address to the plurality of bits included in a physical address.

The address mapping block 630 may map a logical address LOGIC_ADD to a physical address PHY_ADD according to the variable address mapping table VAR_MAP_TABLE. The address mapping block 630 may store the variable address mapping table VAR_MAP_TABLE, and map a logical address LOGIC_ADD to a physical address PHY_ADD according to the variable address mapping table VAR_MAP_TABLE. Since the variable address mapping table VAR_MAP_TABLE is changed depending on which of the host devices transmitted the logical address to be mapped, a scheme in which the address mapping block 630 maps a logical address LOGIC_ADD to a physical address PHY_ADD may be changed each time.

The memory controller 220 of FIG. 6 may operate in the same manner as the memory controller 220 of FIG. 3 except that the range of bits to be mapped according to the variable address mapping table VAR_MAP_TABLE is extended to the entirety of a logical address and a physical address.

Figure 7:
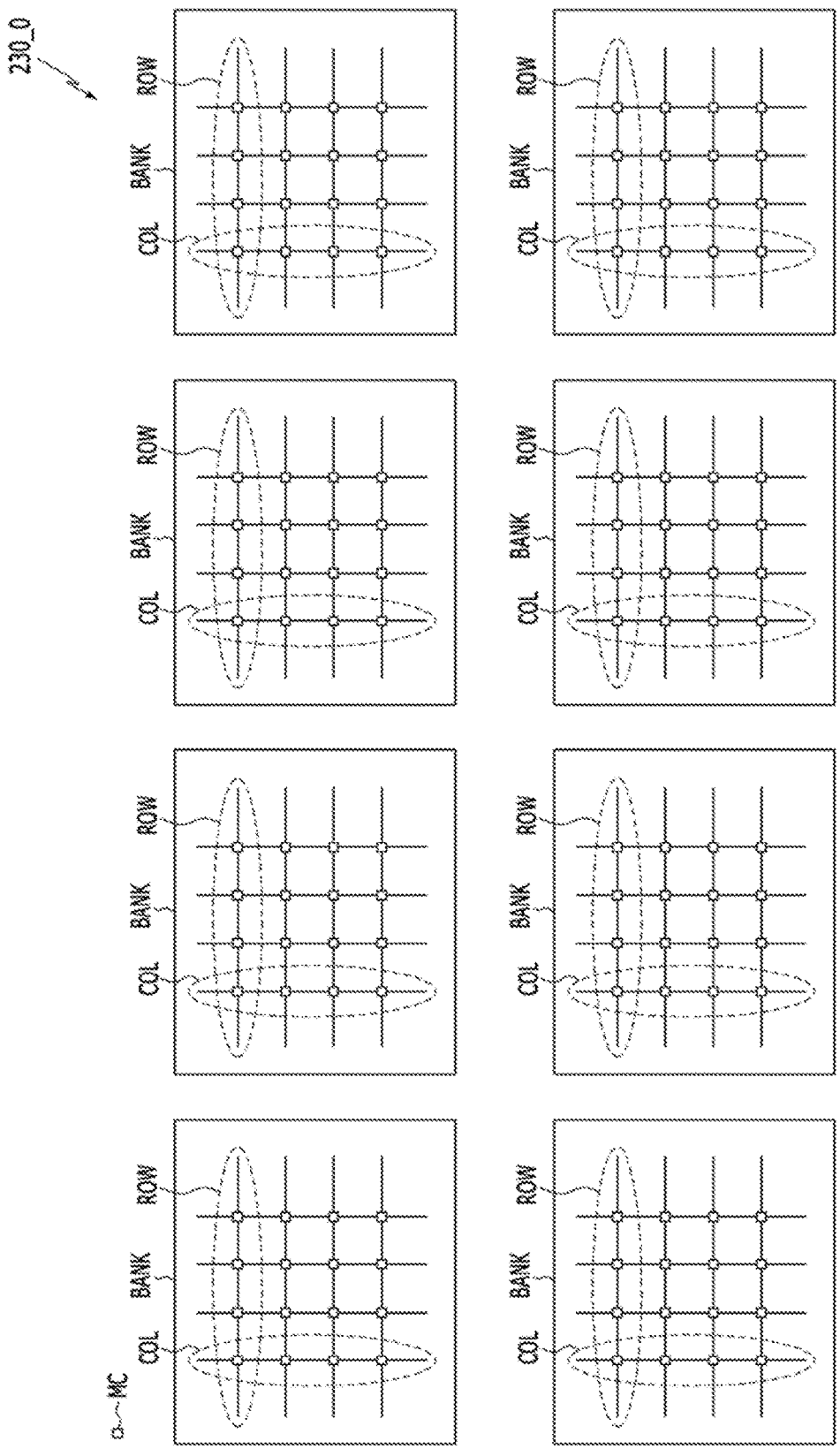
FIG. 7 is a diagram illustrating a memory device in accordance with an embodiment of the present invention.

FIG. 7 is a diagram illustrating a representation of an example of the memory device 230_0 in accordance with an embodiment of the present invention.

Referring to FIG. 7, the memory device 230_0 may include a plurality of memory banks BANK. Each of the memory banks BANK may include a plurality of rows ROW, a plurality of columns COL and a plurality of memory cells MC. While FIG. 7 illustrates the case where the number of memory banks BANK is 8 and each of the numbers of rows ROW and columns COL is 4, these numbers may be changed depending on a design. FIG. 7 illustrates examples of configurations BANK, ROW and COL selected by the row address ROW<0:c−1>, the bank address BANK<0:d−1> and the column address COL<0:e−1>, respectively, as shown in FIGS. 4 and 5.

The memory device 230_0 may be a volatile memory device or a nonvolatile memory device. A volatile memory device may include a dynamic random access memory (DRAM), a mobile DRAM, a static random access memory (SRAM), or a memory device which performs a function similar thereto. A nonvolatile memory device may include a read only memory (ROM), a NOR flash memory, a NAND flash memory, a phase-change random access memory (PRAM), a resistive random access memory (RRAM), a spin transfer torque random access memory (STTRAM), a magnetic random access memory (MRAM), or a memory device which performs a function similar thereto.

The plurality of memory devices 230_0 to 230_m may include the same kind of memory devices or different kinds of memory devices.

According to the present invention, an integrated circuit system is provided capable of mapping a logical address to a physical address by employing an optimized address mapping method taking into consideration an access pattern of a host device or a memory device, and/or the optimization of at least one performance characteristic of a memory device which is to be accessed thereby improving the overall performance of the overall system.

Although various embodiments have been described for illustrative purposes, it will be apparent to those skilled in the art that various changes and modifications may be made without departing from the spirit and scope of the invention as defined in the following claims.

What is claimed is:

1. A memory controller comprising:
a plurality of ports coupled with at least one host device;
a plurality of channels coupled with at least one memory device;
an arbiter receiving a first address received through the plurality of ports, and outputting the first address;
a mapping table storage block, including a plurality of address mapping tables, selecting an address mapping table, corresponding to the first address, among the plurality of address mapping tables, and outputting the selected address mapping table as a variable address mapping table;
an address mapping block mapping the first address to a second address according to the variable address mapping table and a fixed address mapping table; and
a scheduler outputting the second address to the channels,
wherein the address mapping block comprises:
a first mapping unit mapping one or more first bits among a plurality of bits included in the first address, to one or more first bits among a plurality of bits included in the second address, according to the variable address mapping table; and
a second mapping unit mapping one or more second bits among the plurality of bits included in the first address, to one or more second bits among the plurality of bits included in the second address, according to the fixed address mapping table.

2. The memory controller according to claim 1, wherein the first address is a logical address, and the second address is a physical address.

3. The memory controller according to claim 1, wherein the scheduler combines and outputs the one or more first bits of the second address and the one or more second bits of the second address.

4. The memory controller according to claim 1, wherein the second address includes at least one address among a rank address, a chip select address, a row address, a bank address and a column address.

5. The memory controller according to claim 1, wherein the plurality of address mapping tables employ different methods of mapping one or more first bits of the first address to one or more first bits of the second address.

6. An integrated circuit system comprising:
   a plurality of host devices;
   a plurality of memory devices; and
   a memory controller, including a plurality of address mapping tables, mapping a first address received from at least one host device among the plurality of host devices, to a second address, by using an address mapping table, selected among the plurality of address mapping tables, and a fixed address mapping table, and transmitting the second address to at least one memory device among the plurality of memory devices,
   wherein the memory controller comprises:
   a plurality of ports coupled with the host device among the plurality of host devices;
   a plurality of channels coupled with the memory device among the plurality of memory devices;
   an arbiter receiving the first address received through the plurality of ports, and outputting the first address;
   a first mapping unit mapping one or more first bits among a plurality of bits included in the first address, to one or more first bits among a plurality of bits included in the second address, according to the variable address mapping table;
   a second mapping unit mapping one or more second bits among the plurality of bits included in the first address, to one or more second bits among the plurality of bits included in the second address, according to the fixed address mapping table; and
   a scheduler outputting the second address to the channels.

7. The integrated circuit system according to claim 6, wherein the first address is a logical address, and the second address is a physical address.

8. The integrated circuit system according to claim 6, wherein the plurality of address mapping tables employ different methods of mapping one or more first bits of the first address to one or more first bits of the second address.

9. The integrated circuit system according to claim 6, wherein the second address includes at least one address among a rank address, a chip select address, a row address, a bank address and a column address.

10. The integrated circuit system according to claim 9,
    wherein the rank address corresponds to at least two memory devices among the plurality of memory devices,
    wherein the chip select address corresponds to one memory device among the plurality of memory devices,
    wherein the row address corresponds to each of a plurality of rows included in each memory device,
    wherein the bank address corresponds to each of a plurality of banks included in each memory device, and
    wherein the column address corresponds to each of a plurality of columns included in each memory device.

* * * * *